United States Patent [19]

Herzig et al.

[11] Patent Number: 4,972,029
[45] Date of Patent: Nov. 20, 1990

[54] PROCESS FOR PREPARING THERMALLY STABLE CROSSLINKED EPOXY RESINS

[75] Inventors: Christian Herzig, Taching; Bernward Deubzer, Burghausen; Josef Esterbauer, Hochburg, all of Fed. Rep. of Germany

[73] Assignee: Wacker-Chemie GmbH, Munich, Fed. Rep. of Germany

[21] Appl. No.: 325,429

[22] Filed: Mar. 20, 1989

[30] Foreign Application Priority Data

Apr. 22, 1988 [DE] Fed. Rep. of Germany ....... 3813719

[51] Int. Cl.$^5$ ............................................ C08F 283/00
[52] U.S. Cl. .................................... 525/487; 525/523
[58] Field of Search ................................ 525/523, 487

[56] References Cited

U.S. PATENT DOCUMENTS 4,287,326 9/1981 Mikami ............................... 525/523
4,413,104 11/1983 Deubzer et al. .................... 525/474

Primary Examiner—Melvyn I. Marquis

[57] ABSTRACT

Thermally stable, crosslinked epoxy resins are obtained by crosslinking an epoxy resin with a silicon compound containing a basic nitrogen which is bonded to silicon via carbon and to which at least 1 hydrogen atom is bonded directly to the nitrogen atom, and thereafter conditioning the crosslinked epoxy resin.

4 Claims, No Drawings

PROCESS FOR PREPARING THERMALLY STABLE CROSSLINKED EPOXY RESINS

The present invention relates to crosslinked epoxy resins and more particularly to a process for preparing thermally stable crosslinked epoxy resins.

BACKGROUND OF THE INVENTION

Crosslinking of epoxy resins at room temperature by means of a silicon compound having a basic nitrogen which is bonded to silicon via carbon and to which at least 1 hydrogen atom is bonded directly to the nitrogen has been disclosed, for example, in U. S. Pat. No. 4,413,104 to Deubzer et al. Also, German patent application AS No. 1,125,171 to Griebsch et al, describes silicon compounds containing an SiOC-bonded, basic nitrogen to which at least 1 hydrogen atom is bonded directly thereto as curing agents for epoxy resins, in which the curing takes place by heating.

Therefore, it is an object of the present invention to prepare crosslinked epoxy resins which are thermally stable, i.e., their surface hardness and mechanical distortion resistance is retained virtually unchanged, even on heating.

SUMMARY OF THE INVENTION

The foregoing objects and others which will become apparent from the following description are accomplished in accordance with this invention, generally speaking, by providing a process for preparing thermally stable crosslinked epoxy resins, which comprises crosslinking an epoxy resin with a silicon compound containing a basic nitrogen which is bonded to silicon via carbon and at least 1 hydrogen atom is bonded directly to the nitrogen atom, and thereafter conditioning the crosslinked epoxy resin.

DESCRIPTION OF THE INVENTION

The epoxy resins employed in the process of this invention can be any epoxy resins which have heretofore been used in the preparation of crosslinked epoxy resins. Epoxy resins of this type are disclosed, for example, in Kirk-Othmer, Encyclopedia of Chemical Technology, 3rd Edition, Volume 9, pages 267 to 290. They, therefore, need not be described in greater detail. The epoxy resin molding compositions preferably contain, as at least part of the epoxy resin, at least one product from the reaction of 2,2-bis-(hydroxy-phenyl)-propane (bisphenol A) and epichlorohydrin, i.e., a compound of the formula

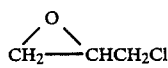

Further examples of epoxy resins preferably employed in the process of this invention are triglycidyl isocyanurate, products obtained from the reaction of bis-(4-hydroxy-phenyl)-methane (bisphenol F) and epichlorohydrin, and phenol novolaks and cresol novolaks.

The epoxy resins can be modified by reaction with organosilicon compounds, such as a silane of the formula

or with hydroxyl and/or alkoxy group-containing organopolysiloxanes.

The silicon compounds containing a basic nitrogen which is bonded to silicon via carbon and to which at least 1 hydrogen atom is bonded directly to the nitrogen are preferably organopolysiloxanes comprising units of the formula

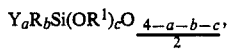

in which R represents the same or different monovalent hydrocarbon radicals having from 1 to 8 carbon atoms per radical, $R^1$ represents the same or different alkyl groups having 1 to 4 carbon atoms per radical and Y represents the same or different, monovalent, SiC-bonded organic radicals containing a basic nitrogen to which at least 1 hydrogen atom is bonded directly to the nitrogen, and a is 0 or 1, preferably an average of from 0.02 to 1.0, b is 0, 1, 2 or 3, preferably an average of from 0.0 to 2.0, and c is 0, 1, 2 or 3, preferably an average of from 0.0 to 2.0.

The silicon compounds containing a basic nitrogen which is bonded to silicon via carbon, and to which at least 1 hydrogen atom is bonded directly to the nitrogen, may, however, also be silanes of the formula

in which Y, R and $R^1$ are the same as above, and d is 0, 1 or 2, silcarbanes of the formula

in which Y and $R^1$ are the same as above, or products obtained from the reaction of at least one compound from at least one of the three classes of silicon compounds mentioned above containing a basic nitrogen which is bonded to silicon via carbon and to which at least 1 hydrogen atom is bonded directly to the nitrogen, and hydrocarbon diols having 2 to 15 carbon atoms per molecule, such as diethylene glycol, bisphenol A or bisphenol F, hydrocarbon triols, such as glycerol, or purely organic polymers containing alcoholic hydroxyl groups, such as hydroxy polyesters, hydroxypolyethers, hydroxypolyacrylates or hydroxypolyurethanes.

The reaction products mentioned above preferably contain an average of at least 1 silicon atom containing a basic nitrogen which is bonded thereto via carbon and to which at least 1 hydrogen atom is bonded directly to the nitrogen, per 3,000 g of reaction product, and more preferably per 1,500 g of reaction product.

Examples of hydrocarbon radicals represented by R are the methyl, ethyl, n-propyl, isopropyl, 2-ethylhexyl and butyl radicals; radicals built up from carbon and hydrogen atoms and containing an aliphatic multiple bond, such as the vinyl and allyl radicals; cycloaliphatic hydrocarbon radicals, such as the cyclopentyl radical and cyclohexyl radical, and methylcyclohexyl radicals; aromatic hydrocarbon radicals, such as the phenyl radical and xenyl radicals, alkaryl radicals, such as the tolyl radicals; and aralkyl radicals, such as the benzyl radical. However, hydrocarbon radicals represented by R, which are bonded to silicon atoms to which a basic nitrogen having hydrogen bonded directly thereto are free from aliphatic multiple bonds. If only because of their availability, it is preferred that at least 50 percent of the radicals represented by R be methyl radicals.

The examples mentioned above of alkyl radicals represented by R having from 1 to 4 carbon atoms per radical also apply equally to the radicals represented by $R^1$.

The radicals represented by Y are preferably those of the formula $$R^2NHR^3—,$$

in which $R^2$ represents hydrogen or the same or different alkyl or cycloalkyl or aminoalkyl radicals having from 1 to 8 carbon atoms per radical, and $R^3$ represents the same or different straight-chain or branched hydrocarbon radicals which are free from aliphatic multiple bonds and contain one carbon atom or 3 or 4 carbon atoms per radical, and more preferably a radical of the formula $$—(CH_2)_3—.$$

The examples of alkyl and cycloalkyl radicals represented by R also apply equally to the alkyl and cycloalkyl radicals represented by $R^2$.

Examples of aminoalkyl radicals represented by $R^2$ are those of the formula

| |
|---|
| $H_2N(CH_2)_3—$ |
| $H_2N(CH_2)_2NH(CH_2)_2—$ |
| $H_2N(CH_2)_2—$ |
| $H_3CNH(CH_2)_2—$ |
| $H_2N(CH_2)_4—$ |
| $H(NHCH_2CH_2)_3—$ and |
| $C_4H_9NH(CH_2)_2 NH(CH_2)_2—$ . |

Preferably, a is an average of from 0.05 to 0.4, b is an average of from 0.5 to 1.5 and c is an average of from 0.1 to 1.0.

The epoxy molding compositions to be crosslinked, according to this invention, can contain one type of silicon compound having a basic nitrogen which is bonded to silicon via carbon and to which at least 1 hydrogen atom is bonded directly to the nitrogen atom, or a mixture of at least two different types of such silicon compounds.

The epoxy molding compositions to be crosslinked according to this invention preferably contain silicon compounds having a basic nitrogen which is bonded to silicon via carbon and to which at least 1 hydrogen atom is bonded directly to the nitrogen, in amounts of from 5 to 90 percent by weight, and more preferably from 25 to 70 percent by weight, based on the total weight of all resins other than those having a basic nitrogen bonded to silicon via carbon and to which at least 1 hydrogen atom is bonded thereto.

It is furthermore preferred that from 0.8 to 1.5, and more preferably from 1.0 to 1.3, hydrogen atoms bonded directly to nitrogen be present per epoxy group.

In addition to an epoxy resin and a silicon compound having a basic nitrogen which is bonded to silicon via carbon and to which at least 1 hydrogen atom is bonded directly to the nitrogen atom, the epoxy molding compositions which are crosslinked by this invention can contain components which are generally employed in crosslinkable compositions. Examples of such components are commercially available crosslinking agents for epoxy resins, such as amino or aminoamide compounds which are free from silicon atoms, for example, melamine resins, solvents, for example, methyl ethyl ketone, methyl isobutyl ketone, ethylene glycol or xylene isomer mixtures or mixtures of at least two solvents of this type, curing catalysts, such as tetra-butyl titanate or aluminum tris(acetylacetonate), pigments, such as titanium dioxide, flow improvers and extenders.

Before crosslinking, the epoxy resin is stored separately from the compound having a basic nitrogen to which at least 1 hydrogen atom is bonded thereto. In crosslinking the composition, the epoxy resin and the compound containing a basic nitrogen to which at least 1 hydrogen atom is bonded directly are mixed with each other. After mixing these two components to give mixtures of lower viscosity than those which contain aminoamides as crosslinking agents, the compositions are crosslinked at room temperature within a few days. The crosslinking can be accelerated by warming to temperatures of from 40° C. to 120° C.

After crosslinking, the crosslinked epoxy resins are conditioned. The conditioning is preferably carried out at 150° C. to 250° C., in particular 180° C. to 250° C. and more preferably from 200° C. to 250° C., preferably over a period of at least 2 hours, and more preferably at least 4 hours. The conditioning can also take place while the crosslinked epoxy resins are being used.

On heating to temperatures to 200° C., or alternatively on storage at 150° C. to 200° C., the conditioned, crosslinked epoxy resins have a virtually unchanged surface hardness, while the surface hardness of epoxy resins crosslinked using conventional aminoamides and conditioned after crosslinking decreases significantly on heat treatment.

The thermally stable, crosslinked epoxy resins prepared by the process of this invention not only have essentially constant surface hardness on heat treatment, but are also particularly moisture-stable, i.e., they exhibit only low water absorption compared with the epoxy resins crosslinked using conventional aminoamides and conditioned after crosslinking.

The thermally stable, crosslinked epoxy resins prepared according to this invention can be employed in electrotechnology as an impregnating resin for motors and insulators and as coatings for pressure rolls which are subjected to considerable heating and as casting resins.

In the following examples, all percentages are by weight, unless otherwise specified.

EXAMPLE 1

(a) About 472 g of a 75 percent strength solution of an organopolysiloxane containing 2.4 percent of Si-bonded hydroxyl groups and having a ratio between SiC-bonded organic radicals and silicon atoms of 1.46:1.0, 37 percent of these radicals being phenyl radicals while the other SiC-bonded organic radicals are methyl radicals, in a commercially available xylene isomer mixture are mixed with 180 g of N-(2-aminoethyl)-3-aminopropyltrimethoxysilane. The resultant mixture is warmed at 100° C. for 3 hours. The components of the reaction mixture which boil under these conditions are subsequently removed by distillation at 150° C. and 1 hPa (abs.). An organopolysiloxane having a viscosity of 2.2 Pa.s at 25° C. and a basicity of 3.13 meq/g is recovered as the residue. The resultant organopolysiloxane has the formula

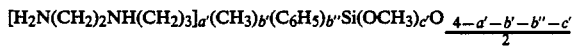

in which a' is on an average 0.2, b' is on an average 0.7, b" is on an average 0.4, and c' is on an average 0.4.

(b) About 42 g of a commercially available reaction product obtained from 2,2-bis-(4-hydroxyphenyl)-propane and epichlorohydrin having an equivalent weight of 200 are mixed with 47 g of the organopolysiloxane whose preparation is described in (a) above. From the mixture, test specimens are cast, cured at 120° C. for 4 hours and subsequently conditioned for an additional 4 hours at 200° C. After conditioning, the conditioned, crosslinked epoxy resin has the following values for Shore D hardness, determined in accordance with DIN 53 505:

Shore D at 25° C. : 84

Shore D at 200° C. : 52

Before conditioning, the Shore D hardness of the crosslinked epoxy resin at 200° C. is only < <30.

COMPARISON EXAMPLE 1:

About 47.5 g of a commercially available reaction product obtained from 2,2-bis-(4-hydroxyphenyl)-propane and epichlorohydrin having an equivalent weight of 190 are mixed with 9.0 g of tetra-β-aminoethyl o-silicate having an N-H equivalent of 36 and whose preparation is described in Example 1 of DE-AS 1,125,171 which was cited previously in the specification. From the mixture, test specimens are cast, cured at 80° C. for 5 hours and subsequently conditioned for an additional 6 hours at 200° C. After conditioning, the conditioned, crosslinked epoxy resin has the following values for the Shore D hardness, determined in accordance with DIN 53 505:

Shore D at 25° C.: 84

Shore D at 200° C.: < <30

The Shore D hardness decreases considerably at 200° C.

EXAMPLE 2:

About 73 g of a reaction product obtained from 2,2-bis-(4-hydroxyphenyl)-propane and epichlorohydrin having an equivalent weight of from 185 to 220 (Epikote 215 from Messrs. Shell) are mixed with 82 g of the organopolysiloxane whose preparation is described in Example 1(a) above. The mixture is cured at 120° C. for 4 hours and subsequently conditioned at 200° C. The following softening points, determined in accordance with DIN 53 460 are determined for the conditioned, crosslinked epoxy resin:

|  | Softening point |
|---|---|
| Conditioning at 200° C. 4 hours: | 105° C. |
| Conditioning at 200° C. 8 hours: | 153° C. |
| Conditioning at 200° C. 24 hours: | <185° C. |

EXAMPLE 3:

(a) The procedure described in Example 1 (a) above is repeated, except that, instead of the 472 g of the organopolysiloxane, a mixture containing 495 g of an organopolysiloxane containing 14 percent of Si-bonded methoxy groups and having a ratio between SiC-bonded organic radicals and silicon atoms of 1.36:1.0, 46 percent of these radicals being phenyl radicals while the remaining radicals are methyl radicals, and 660 g of a 75 percent solution of an organopolysiloxane containing 2.4 percent of Si-bonded hydroxyl groups and having a ratio between SiC-bonded organic radicals and silicon atoms of 1.46:1.0, 37 percent of these radicals being phenyl radicals while the remaining SiC-bonded organic radicals are methyl radicals, in a commercially available xylene isomer mixture, and instead of 180 g of N-(2-aminoethyl)-3-aminopropyltrimethoxysilane, 133 g of N-(2-aminoethyl)-3-aminopropyltrimethoxysilane are employed.

About 1115 g of an organopolysiloxane having a volatility of 2.0 percent are obtained on distillation for 1 hour at 150° C. and 1 hPa (abs.). The resultant organopolysiloxane has a viscosity of 4.7 Pa.s at 25° C., a basicity of 1.09 meq/g and has the following formula

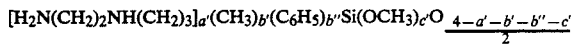

in which a' is an average of 0.06, b' is an average of 0.79, b" is an average of 0.55, and c' is an average of 0.44.

(b) About 20 g of a reaction product obtained from 2,2-bis-(4-hydroxyphenyl)-propane and epichlorohydrin having an equivalent weight of from 185 to 220 (Epikote 215 from Messrs. Shell) are mixed with 61 g of the organopolysiloxane whose preparation is described in Example (a) above. The mixture is cured at 120° C. for 4 hours and subsequently conditioned for an additional 24 hours at 200° C. The softening point, determined in accordance with DIN 53 460, is determined for the conditioned, crosslinked epoxy resin and is shown below:

Conditioning at 200° C. 24 hours: 88° C.

COMPARISON EXAMPLE 2:

About 57.0 g of a reaction product obtained from 2,2-bis-(4-hydroxyphenyl)-propane and epichlorohydrin having an equivalent weight of from 185 to 200 (Epikote 215 from Messrs. Shell) are mixed with 22.5 g of commercial polyaminoamine (available as V 114 from Messrs. Shell). The mixture is cured at 120° C. for 4 hours and subsequently conditioned at 200° C. The following softening points were determined for the conditioned crosslinked epoxy resin:

|  | Softening point |
|---|---|
| Conditioning at 200° C. 4 hours: | 59° C. |
| Conditioning at 200° C. 8 hours: | 63° C. |

| | |
|---|---|
| -continued | |
| | Softening point |
| Conditioning at 200° C. 24 hours: | 69° C. |

EXAMPLE 4:

About 190 g of a reaction product obtained from 2,2-bis-(4-hydroxyphenyl)-propane and epichlorohydrin having an equivalent weight of 190 (Epikote 828 from Messrs. Shell) are mixed with 240 g of the organopolysiloxane whose preparation is described in Example 1(a) above. From the mixture, test specimens are cast, cured at 60° C. for 8 hours and, subsequently, conditioned or stored for 1000 hours at 150° C. or 200° C., respectively. The Shore D hardness, determined in accordance with DIN 53 505, of the conditioned, crosslinked epoxy resin is determined at 25° C. and 150° C. or 200° C. The results are illustrated in the table.

COMPARISON EXAMPLE 3:

The procedure described in Example 4 is repeated, except that instead of the 240 g of the organopolysiloxane whose preparation is described in Example 1(a) above, 270 g of commercial polyaminoamide (available as V 115 from Messrs. Shell) are employed. The results are illustrated in the table.

COMPARISON EXAMPLE 4:

The procedure described in Example 4 is repeated, except that instead of the 240 g of the organopolysiloxane whose preparation is described in Example 1(a) above, 95 g of commercial polyaminoamide (available as V 140 from Messrs, Shell) are employed. The results are illustrated in the table.

TABLE

| | After conditioning for 1000 h at 150° C. Shore D Hardness | | After conditioning for 1000 h at 200° C. Shore D Hardness | |
|---|---|---|---|---|
| | at 25° C. | at 150° C. | at 25° C. | at 200° C. |
| Example 4 | 76 | 60 | 77 | 71 |
| Comparison Example 3 | 79 | <<30 | 76 | <<30 |
| Comparison Example 4 | 79 | 55 | 81 | <<30 |

The Shore D hardness of the epoxy resins crosslinked using conventional aminoamides decreases considerably after storage at 150° C. or 200° C.; whereas, the Shore D hardness of the epoxy resins crosslinked using the silicon compounds employed according to this invention is virtually unchanged and is even higher after storage at 200° C., i.e., increases over the value obtained after storage at 150° C.

What is claimed is:

1. A process for preparing thermally stable, crosslinked epoxy resins which comprises crosslinking an epoxy resin with a silicon compound having a basic nitrogen which is bonded to silicon via carbon and to which at least 1 hydrogen atom is bonded directly to the nitrogen atom and thereafter conditioning the crosslinked epoxy resin at a temperature of from 150° C. to 250° C. for at least 2 hours.

2. The process of claim 1, wherein at least part of the epoxy resin to be crosslinked comprises a product obtained from the reaction of 2,2-bis-(4-hydroxyphenyl)-propane and epichlorohydrin.

3. The process of claim 1, wherein the silicon compound is an organopolysiloxane having units of the formula

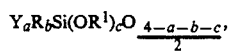

in which R is a monovalent hydrocarbon radical having from 1 to 8 carbon atoms per radical, $R^1$ is an alkyl group having from 1 to 4 carbon atoms per radical and Y is a monovalent SiC-bonded organic radical having a basic nitrogen to which at least 1 hydrogen atom is bonded directly to the nitrogen atom, and a is an average of from 0.2 to 1.0, b is an average of from 0.0 to 2.0, and c is an average of from 0.0 to 2.0.

4. The process of claim 2, wherein the silicon compound is an organopolysiloxane having units of the formula

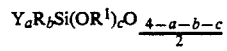

in which R is a monovalent hydrocarbon radical having from 1 to 8 carbon atoms per radical, $R^1$ is an alkyl group having from 1 to 4 carbon atoms per radical and Y is a monovalent SiC-bonded organic radical having a basic nitrogen to which at least 1 hydrogen atom is bonded directly to the nitrogen atom, and a is an average of from 0.02 to 1.0, b is an average of from 0.0 to 2.0, and c is an average of from 0.0 to 2.0.

* * * * *